United States Patent [19]
Kronert

[11] Patent Number: 4,734,080
[45] Date of Patent: Mar. 29, 1988

[54] ROTARY-ELASTIC, OSCILLATION-DAMPING SHAFT COUPLING

[75] Inventor: Curt Kronert, Mulheim/Ruhr, Fed. Rep. of Germany

[73] Assignee: Machinenfabrik Stromag G.m.b.H., Fed. Rep. of Germany

[21] Appl. No.: 924,164

[22] Filed: Oct. 29, 1986

Related U.S. Application Data

[63] Continuation of Ser. No. 629,930, Jul. 11, 1984, abandoned.

[30] Foreign Application Priority Data

Jul. 13, 1983 [DE] Fed. Rep. of Germany ....... 3325214
Jan. 4, 1984 [DE] Fed. Rep. of Germany ....... 3400127
Mar. 7, 1984 [DE] Fed. Rep. of Germany ....... 3408286

[51] Int. Cl.$^4$ .......................... F16D 3/80; F16F 15/16
[52] U.S. Cl. .......................... 464/26; 464/38
[58] Field of Search .............. 192/56 R; 464/10, 24, 464/26, 27, 30, 37, 38, 39

[56] References Cited

U.S. PATENT DOCUMENTS

| | | | |
|---|---|---|---|
| 1,126,219 | 1/1915 | Hupp | 464/38 |
| 1,165,381 | 12/1915 | Anderson | 464/26 |
| 1,828,370 | 10/1931 | Huddle | 464/39 |
| 2,333,553 | 11/1943 | Potgieter et al. | 464/10 |
| 2,513,379 | 7/1950 | Thelander | 464/68 X |
| 2,560,427 | 7/1951 | Foss | 464/38 |
| 3,166,168 | 1/1965 | Hornschuch | 464/39 X |
| 4,062,203 | 12/1977 | Leonard et al. | 464/38 |

FOREIGN PATENT DOCUMENTS

| | | | |
|---|---|---|---|
| 740978 | 11/1943 | Fed. Rep. of Germany | 464/39 |
| 2444787 | 4/1975 | Fed. Rep. of Germany | . |
| 3033302A1 | 4/1981 | Fed. Rep. of Germany | . |
| 3033302 | 4/1981 | Fed. Rep. of Germany | . |
| 3228673 | 3/1983 | Fed. Rep. of Germany | . |
| 651151 | 3/1979 | U.S.S.R. | 464/26 |

Primary Examiner—Daniel P. Stodola
Attorney, Agent, or Firm—Biebel, French & Nauman

[57] ABSTRACT

A rotary-elastic oscillation-damping shaft coupling includes a fluid damping arrangement. Transmission of torque from the primary part to the secondary part is accomplished by a disk-like coupling part which extends approximately perpendicular to the axis of rotation. The coupling part is provided on one side with axially-extending projections and recesses arranged in a ring. The lateral surfaces of the projections and recesses are inclined toward one another in a circumferential direction. The coupling part engages similar projections and recesses of the disk-like secondary part, or a coupling disk connected to the latter. Sets of spring elements, preferably cup springs, are arranged laterally on the coupling part. The coupling is filled with damping oil, which is pressed through throttle devices provided under the action of the axially-shiftable coupling disk, from one side of the disk to the other.

11 Claims, 14 Drawing Figures

ROTARY-ELASTIC, OSCILLATION-DAMPING SHAFT COUPLING

This application is a continuation of U.S. application Ser. No. 629,930, filed July 11, 1984, now abandoned.

BACKGROUND OF THE INVENTION

The present invention relates to elastic shaft couplings which provide for damping of fluctuations in the rotational velocity of the driving shaft.

According to German Offenlegungsschrift No. 24,44,787 and German Pat. No. 30 33 302 A 1, couplings are known in which radially-directed sets of leaf springs are positioned between a primary part and a secondary part and are gripped by intermediate elements. Between the elements, for the purpose of damping, are situated oil-filled chambers. The oil, upon application of a load, is forced from one chamber to the other. U.S. Pat. No. 2,513,379 discloses a coupling in which helical springs, tangentially directed in circumferential direction to the axis of rotation of the coupling are partially surrounded by cup-like casings. The casings can be slipped into one another and define aperatures through which damping oil flows. These constructions are limited in that they permit only slight angular deflections between the primary part and secondary part and, additionally are very complicated in structure.

German Pat. No. 3,228,673 A 1 discloses a rotary oscillation damper intended for use in vehicle friction-clutch couplings, in which the transmission of torque from the drive shaft to the somewhat drumlike secondary part carried by the shaft is accomplished by means of a ring-shaped coupling body, disposed in the secondary part. The coupling body engages the drive shaft with a thrust device which permits longitudinal displacement and is displaceably connected to the periphery of the secondary part by means of an axial tooth construction. Cup springs, supported on the wall of the secondary part, are situated on both sides of the coupling body. The chambers on both sides of the springs are filled with damping oil, which, upon application of a load, can flow over from one chamber into the other through a throttle channel located in the coupling body. When the driving primary part moves in one direction of rotation or the other, the coupling body comes to lie against one cup spring or the other as a result of the variable axial thrust. The overflowing oil carries along the damped secondary part.

This sort of arrangement and manner of loading the springs makes possible greater angular deflections between the primary and secondary parts than in the case of other prior couplings. This construction is disadvantageous in several respects, however. First, only one cup spring is used in each direction of rotation. The other remains non-participating. This must be regarded as poor utilization of the existing spring volume, adding substantial cost to the coupling construction. The variable stresses on the springs when the direction of rotation is reversed also cause considerable pre-stressing of the springs, which must be greater than the operating stress, whereby further limits are placed on the area of effective rotation. Furthermore, it must be regarded as disadvantageous that, as a result of the immediate proximity of the coupling body to the cup springs, contaminated damping oil can get on the thrust device as a result of wear. This can lead to premature wear on the thrust device and thereby to shortening of the life span of the coupling.

Fundamentally, coupling members whose inclined surfaces lie tangential to the axis of rotation, as in the case of the aforementioned German patent, have the disadvantage of a torsional play which cannot be eliminated, by means of which velocity impacts are generated when the direction of rotation is reversed. Such impacts can have a very deleterious effect on the coupling and the machines to which it is attached. Also, with time, due to the gradual weakening of the springs, there occurs an increase in the torsional play, which can only be eliminated by inserting new springs in a time consuming operation. The shut down time may be unpermissibly long in some instances.

The problem forming the basis of the invention is the creation of a high-rotary-elastic shaft coupling with fluid damping or dash-pot action in which the above-mentioned disadvantages are avoided and which has a high specific transmitting capacity; and in which the transmitting mechanism, which converts the tangential movement of the primary part into an axial movement and thence again into a tangential movement of the secondary part, is free from play; and which fully utilizes the total spring volume independently of the direction of moment.

Additionally, depending on the instances of application and conditions of operation, the damping behavior of a high-rotation-elastic coupling can be controlled according to the present invention with fluid damping. Thus there can be the requirement that the fluid damping should increase with increasing moment of rotation, or that greater damping be provided in passing through zero, that is, when the rotational force moment is zero. Furthermore, in the case of installations heavily prone to oscillation or vibration, there is the desire to alter the damping additionally.

SUMMARY OF THE INVENTION

According to the present invention, the transmission of a rotational moment from the primary part to the secondary part is accomplished by means of an axially-shiftable coupling part disposed between the two. The coupling part acts upon sets of axially- or coaxially-disposed spring elements, preferably cup springs, which are supported on the secondary part. Axial displacement of the coupling part is accomplished by means of axially-extending projections and recesses arranged in the form of a ring on a surface approximately perpendicular to the axis of rotation, and having lateral surfaces inclined reciprocally to one another in a circumferential direction.

Between the primary part and the secondary part, perpendicular to the axis of rotation and next to the wall of the secondary part, may be disposed a concentric, ring-like coupling disk, which internally is connected, unrotatably and axially-displaceably, to the primary part by means of a tooth arrangement. A ring of axially-extending projections and recesses is disposed on the perpendicular wall of the secondary part and engages the side of the disk facing the latter; and, on the other side of the disk, between the disk and the housing, are disposed sets of spring elements, preferably cup springs, which are guided internally on pins.

Between the coupling disk and the sets of spring elements may be disposed a supporting plate or disk which covers over all the sets of springs and is fixed against rotation with relation to the pins of the spring elements by means of a pin or peg. The supporting disk may act as a thrust bearing.

Between the primary part and the secondary part may be disposed two concentric, ring-like coupling disks, rotatable with relation to each other, which are provided on the sides facing each other with axially-extending projections and recesses, engaging in one another and arranged in a ring. One disk is connected internally, unrotatably and axially-shiftable, by means of a tooth arrangement, to the primary part. The other disk is connected externally, unrotatably and axially-shiftably, by means of a tooth arrangement, to the secondary part. Sets of cup springs may be provided on both sides of the pair of disks.

Further in accordance with the present invention, there is provided at the flow-through opening between the chambers defined by the coupling part a tube-like control part. The control part is provided at its outer end with a radial packing or calking, which cooperates with corresponding axially-directed channels in the primary or secondary part. The channels are provided with a plurality of throttle openings situated one behind another on axis-parallel planes and leading into the interior of the coupling. The openings are swept over by the radial packing during the working stroke. At least one throttle opening on the front side of the coupling is alterable in its cross section by means of a regulating screw or the like.

In order to be able to adjust the damping from outside the coupling, at least one throttle opening can be altered in cross section by means of a regulating screw. Alternatively, the regulating screw can adjust an automatically-operating, pressure-dependent valve. The radial packing may be effective only in partial areas of the working stroke.

According to the type of construction of the coupling, the coupling teeth between the coupling part and the primary part can serve as the flow-through opening between the chambers, with the control part being disposed on the coupling part. Borings in the supporting disk and in the coupling part, which are situated in the range of the spring pins or bolts, can serve as the flow-through opening between the chambers, a control part being disposed on each boring in the supporting disk.

Other objects and advantages of the invention will be apparent from the following description, the accompanying drawings and the appended claims.

DETAILED DESCRIPTION OF THE PREFERRED EMBODIMENTS

Figure 1:
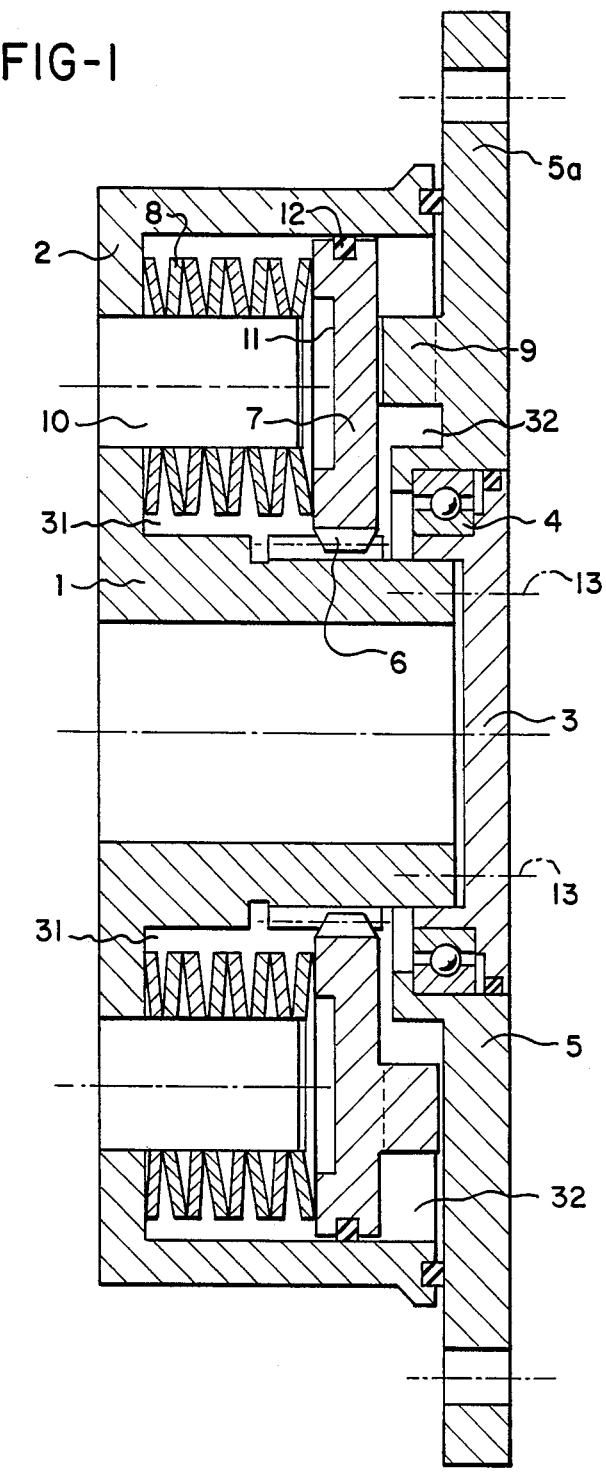
FIG. 1 is a sectional view taken along the longitudinal axis of a first embodiment of the present invention.

FIG. 1 is a longitudinal sectional view, illustrating a first embodiment of the present invention. The primary part 1 is connected to the housing 2, which is closed off by the cover 3. Part 1 may be attached to or may be a part of a drive shaft which is connected to the drive source, such as a motor or engine, and which is intended to drive a driven part or machine, attached to secondary part 5. The secondary part 5 is held on the cover 3 by means of the ball bearing 4. The secondary part is provided with a flange 5a for connection to the driven machine. It will be appreciated, of course, that the secondary part 5 may be connected to the drive source and that the machine which is to be driven may then be connected to primary part 1.

Between the primary part 1 and the secondary part 5, next to the wall of the latter, is disposed a concentric, ring-like coupling disk or plate 7, which is connected internally, by means of a tooth arrangement 6, unrotatably and axially-shiftably, to the primary part 1. Teeth on the part 1 interfit with teeth on disk 7 to eliminate relative rotational movement between part 1 and disk 7, while permitting disk 7 to slide longitudinally along part 1. On the side wall of the secondary part 5 and the side of the coupling disk 7, facing the secondary part 5, are disposed rings of axially-extending projections 9 and recesses with side surfaces 9a (see FIGS. 5a and 5b), inclined with relation to one another in a circumferential direction. The projections 9 engage one another according to the type of toothing surface. On the other side of the coupling disk 7, between the disk 7 and the wall of the housing, are disposed sets of cup springs 8, which are guided internally on bolts or pins 10.

Upon initiation of rotation of the primary part 1, the coupling disk 7 is carried along; so also is the secondary part 5 by means of the projections 9. At the same time, the projections, whose lateral surfaces 9a have an inclination of 20° to 40°, for example, slide upon one another in a circumferential direction, whereby pressure is exerted on the coupling disk 7 by means of the axial components of the sliding force and, through the disk 7, pressure is exerted on the set of springs 8.

With increasing moment of rotation, this can take place until, depending on how the coupling is configured, the projections 9 slide over one another—that is, the coupling acts as overload protection for the associated machine. Alternatively, stops are provided for limiting the path of the springs, upon attainment of which the coupling then acts rigid against torsion. The latter is provided, in FIG. 1, by the fact that the recesses 11 of the coupling disk 7 are adjusted in their depth to the permissible travel stroke. The smaller the inclination of the lateral surfaces 9a, and the longer the travel stroke, the larger is the torsion angle of the coupling. With suitable adjustment of the inclination and length of these lateral surfaces and the characteristic curve of the sets of springs, the couplings can be created with very different properties—hard or soft, for example. Angles of rotation up to 30° can be attained, with an inclination of 20° if the ring of teeth lie favorably approximately on the half-diameter of the coupling disk 7. It is advantageous that the coupling operate in the same manner in both directions of rotation, whereby all sets of springs are acted upon simultaneously.

The tooth arrangement 6 is completely free of play and self-adjusting. It is also unsusceptible to wear due to friction. Additionally, it is located outside the region of the cup springs, where wear can possibly occur. This is also contributed to by the packing 12, with which the coupling disk 7 is provided on its circumference.

The inside of the coupling is filled with oil. The coupling disk 7 subdivides the coupling into two oil spaces, so that, due to the pumping movement of the disk, as the disk moves axially toward or away from secondary part 5, oil flows through the tooth arrangement 6. The tooth arrangement 6 therefore acts as to control the flow rate of oil between the two oil spaces defined on opposite sides of disk 7 and, as a consequence, controls the amount of damping provided by the oil.

The tension of the sets of springs 8 can be regulated by the adjusting screws 13 of the lid 3, indicated by dashed lines. Adjustment is necessary for initial setting of the springs. Adjustment also is desired for varying the characteristic curve. Also, the characteristic curve of the coupling can be regulated by varying the sets of springs; stronger or weaker cup springs, or even combinations of both, can be used.

Figure 2:
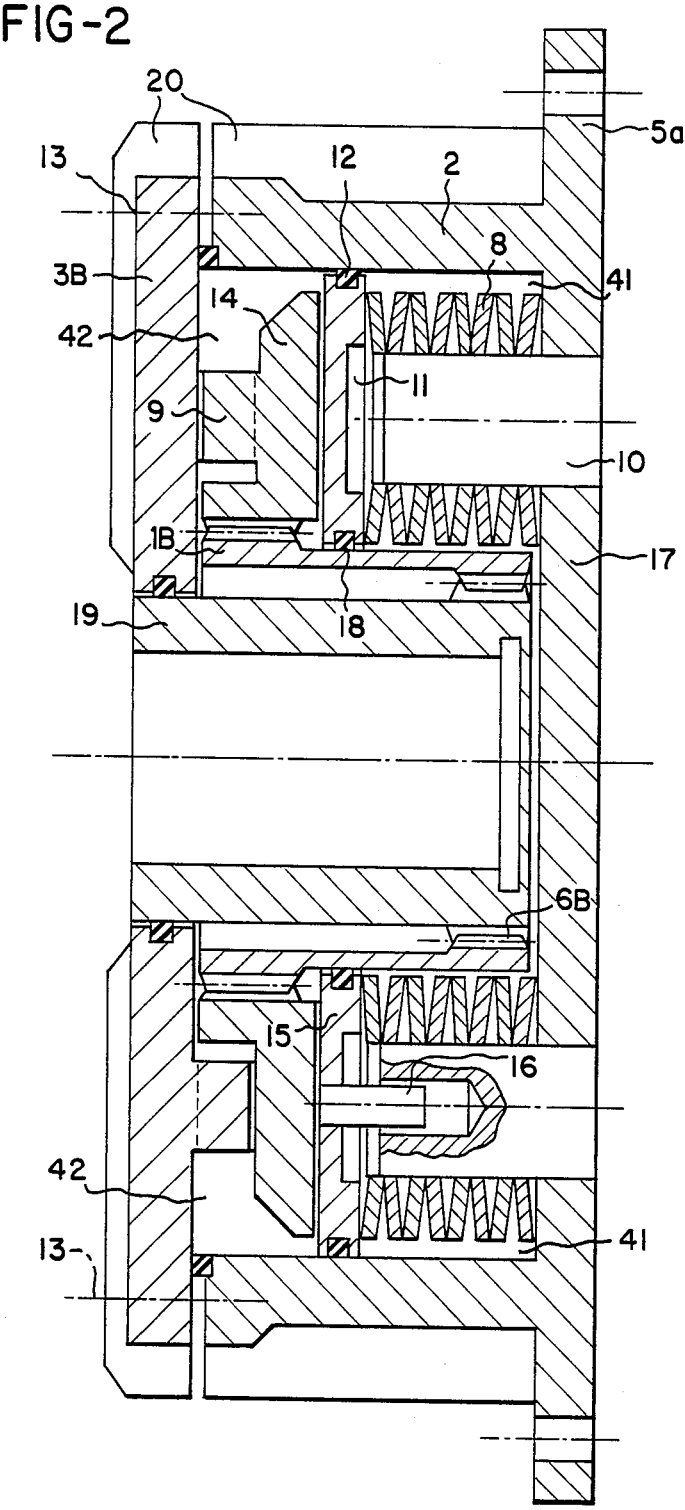
FIG. 2 is a sectional view taken along the longitudinal axis of a second embodiment of the present invention.

In the embodiment of FIG. 2, a similar structure is provided which also includes a supporting disk or plate 15 between the coupling disk 14 and the sets of springs 8. Plate 15 covers all the sets of springs and is locked against rotation with relation to the secondary part 17 by means of pegs or pins 16, which engage in the bolt 10. In this case, the supporting disk is provided with recesses or clearances 11, which serve as stops for the travel stroke. Cover 3B is attached to secondary part 17 by means of bolts, indicated by dashed lines 13. Internally and externally, the supporting disk 15 carries packings 12 and 18, which subdivide the coupling into two oil spaces, with the tooth arrangement 6B acting as a throttle for the passage of oil between the spaces. The supporting disk 15 is designed as a thrust bearing for the coupling disk 14, which considerably reduces the friction to which the coupling disk 14 is exposed.

As distinguished from FIG. 1, here the primary part 1B is connected, through a universal joint coupling including, to the hub 19 of the driving or driven shaft, whereby rectification of shaft displacement in radial and axial directions is possible. Part 1B is, in turn, connected to coupling disk 14 by means of a tooth arrangement therebetween. For cooling, the housing 2 and the lid 3B of the secondary part 17 are provided with cooling vanes or fins 2A, 3A. In order to attain twice as great rotation, it is possible, if desired, to connect two couplings of the type of construction shown in FIG. 1 or FIG. 2 to the secondary part 5 or 17.

Figure 3:
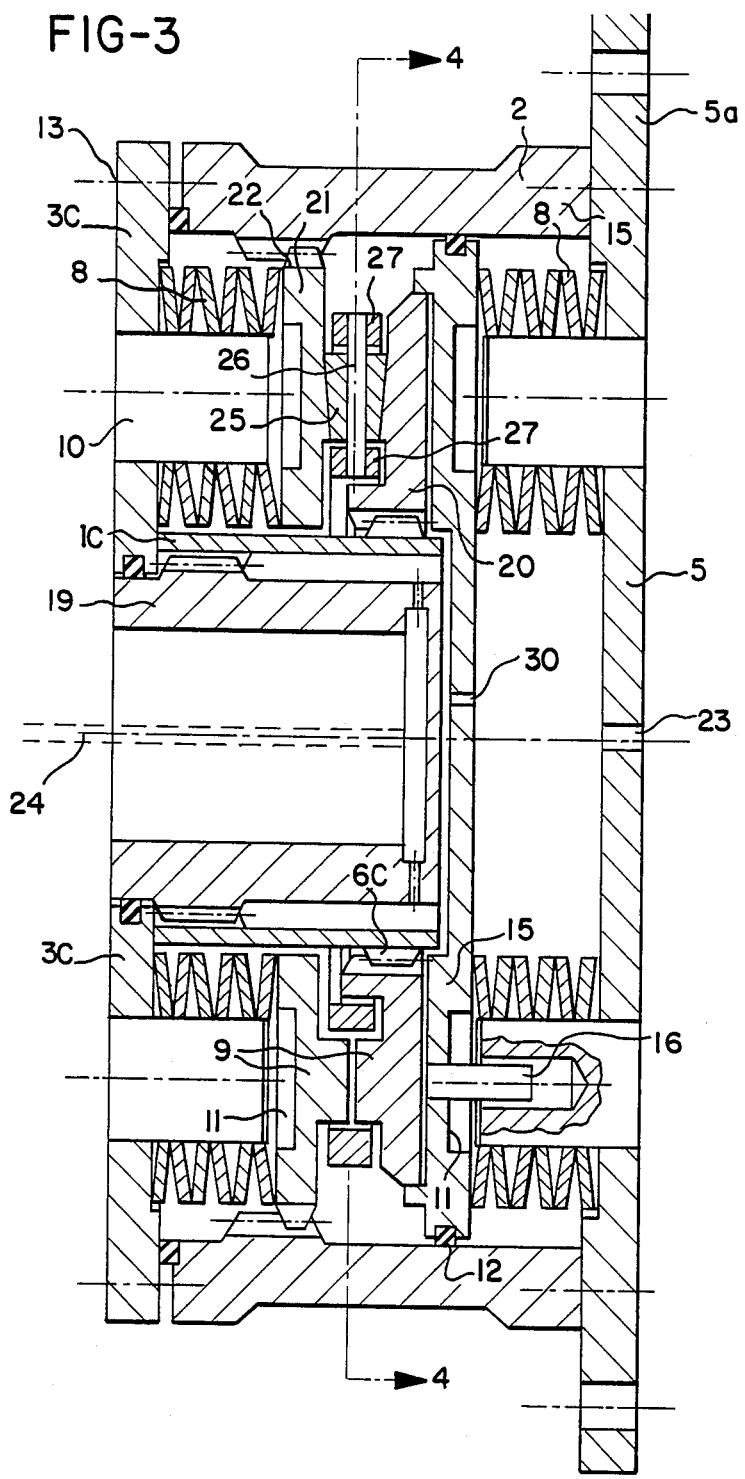
FIG. 3 is a sectional view taken along the longitudinal axis of a third embodiment of the present invention.
Figure 4:
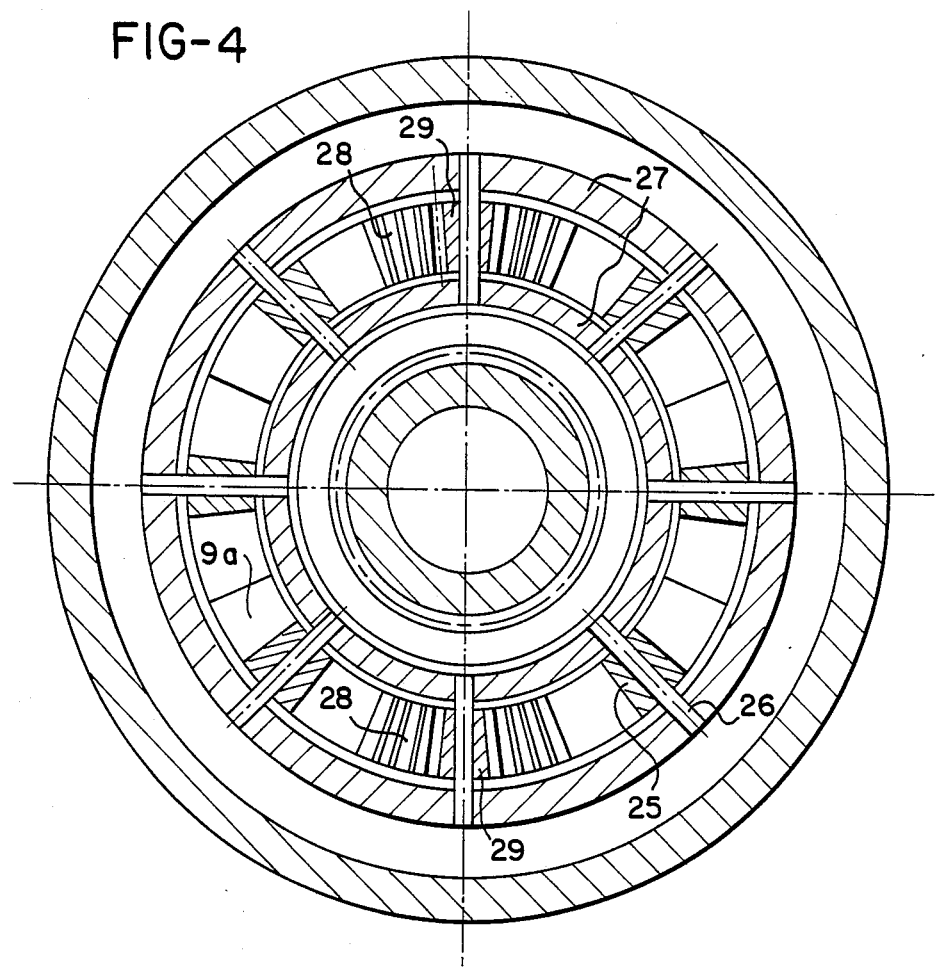
FIG. 4 is a sectional view, taken generally along line 4—4 in FIG. 3.

A further embodiment of the invention is shown in FIGS. 3 and 4. Between the primary part 1C and the housing mantle 2 of the secondary part 5, are disposed, axially side by side, two concentric, ring-like coupling disks 20 and 21. Disk 20 is connected internally, unrotatably and axially-displaceably, through a tooth arrangement 6C to the primary part 1. Disk 21 is connected through a tooth arrangement 22, unrotatably and axially-displaceably, to the housing mantle 2. Mantle 2 is bolted to secondary part 5 and cover 3C is bolted to mantle 2, as indicated by lines 13.

On the faces turned toward each other, the coupling disks 20 and 21 are provided approximately in the center, between the external and internal diameters, with rings of axially-extending projections 9, having oblique lateral surfaces 9a (according to FIG. 5c), between which are situated truncated-cone-like roller bodies 25. Bodies 25 are held by axles 26 in a cage 27. As shown in FIG. 4, at two diametrically-opposite points on the rings are disposed gear teeth 28. Two guiding gear wheels 29, disposed in the cage 27, engage gear teeth 28. The use of roller bodies on the lateral surfaces of the projections reduces the friction between the coupling disks 20 and 21, and the gear teeth 28 and wheels 29 ensure the positioning of rollers 25 on the inclined surfaces 9a.

Sets of springs 8, which are held by bolts 10, are disposed on both sides next to the coupling disks 20 and 21. Between the coupling disk 20 and the cup springs 8 of the right-hand side is a supporting disk 15 which acts as a thrust bearing. On its external circumference is provided a packing 12. The coupling disks 20 and 21 are provided with stops 11 for limiting the relative rotation.

Upon initiation of rotation in either direction, the sets of springs 8 on both sides are acted upon at the same time. This arrangement makes a larger angle of relative rotation between parts 1C and 5 possible, in contrast to that of FIGS. 1 and 2.

The coupling is provided with a circulating damping fluid. The supporting disk 15 underneath the center of the axis defines a throttle opening 30. A space at the left of the supporting disk (high-pressure space) and a space at the right of the supporting disk (low-pressure space) are formed by the supporting disk 15. A pressure which effects an overflow of the oil through the throttle opening 30 into the low-pressure space builds up in the high-pressure space as a result of the pumping movement of the disks 20 and 21; from there, the oil goes out through the central opening 23, and from there it is supplied again to the opening 24 of the high-pressure space through a duct (not shown). Return of the oil takes place by means of an external pump and an interposed oil tank, which is necessary especially in the case of couplings for great propulsive output, which can become very hot.

Figure 5A:
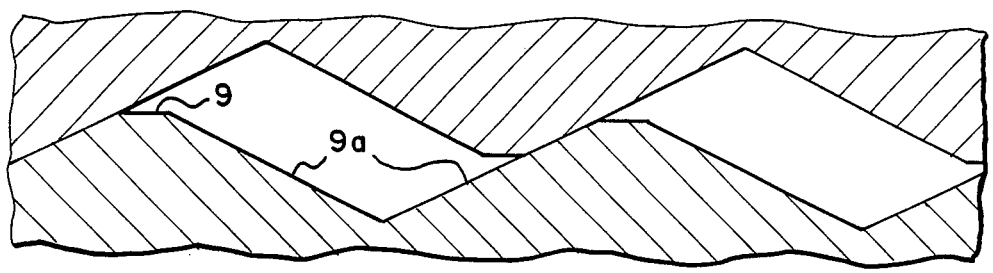
FIGS. 5a–5d are enlarged partial sectional views illustrating various configurations of projections on the secondary part and the coupling disk.
Figure 5B:
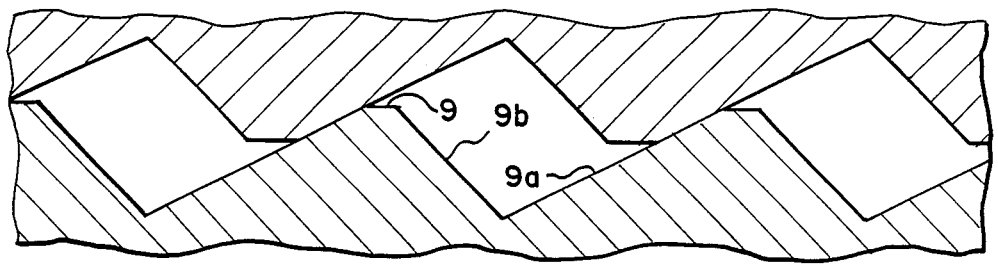
Figure 5C:
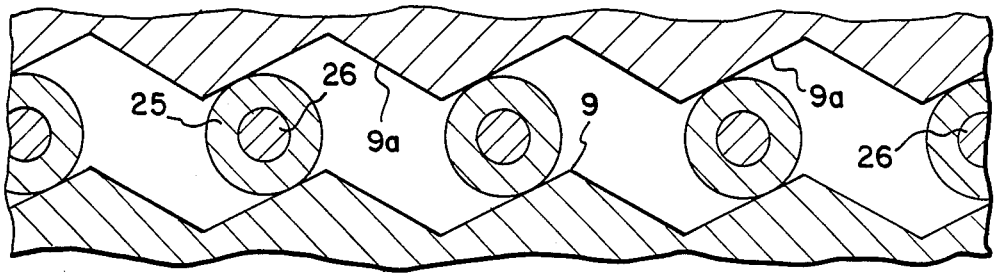
Figure 5D:
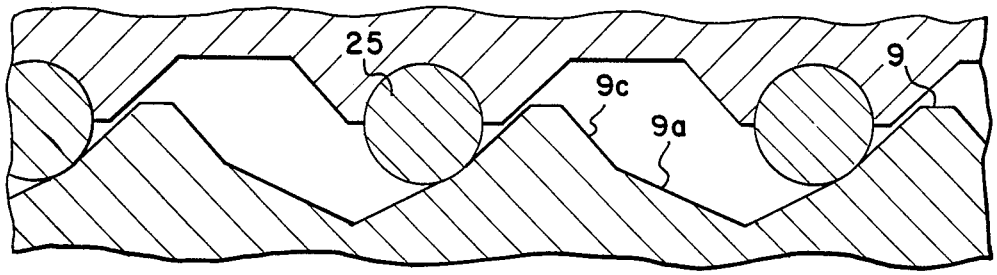

Various embodiments of the ring-like projections in cross section in the positions which they assume under load are represented in FIGS. 5a–5d. FIG. 5a shows projections 9 with lateral surfaces 9a oriented at identical angles of inclination about 20° on the front and rear sides. FIG. 5b shows projections 9 with lateral surfaces 9a and 9b at variable angles of inclination (approximately 20°–45°) on the front and rear sides, whereby the coupling produces a softer charateristic curve in one direction of rotation and a harder characteristic curve in the other direction of rotation. FIG. 5c shows a profile as in FIG. 5a but with roller bodies between the rings, which bodies are held in a cage 27 by means of axles 26. This reduces the friction between the projections 9. FIG. 5d shows, in the upper ring, a profile with lateral surfaces 9a of 20°, which ascend (9c) more steeply toward the apex (to 45°), whereby a progressive characteristic curve of the coupling results with increasing stress. In the lower ring, the roller bodies 25 are held in troughs. In the design according to FIG. 5c, there is also the possibility of providing the lateral surfaces 9a with teeth, on which the roller bodies, likewise provided with mating teeth, can roll.

Figure 6:
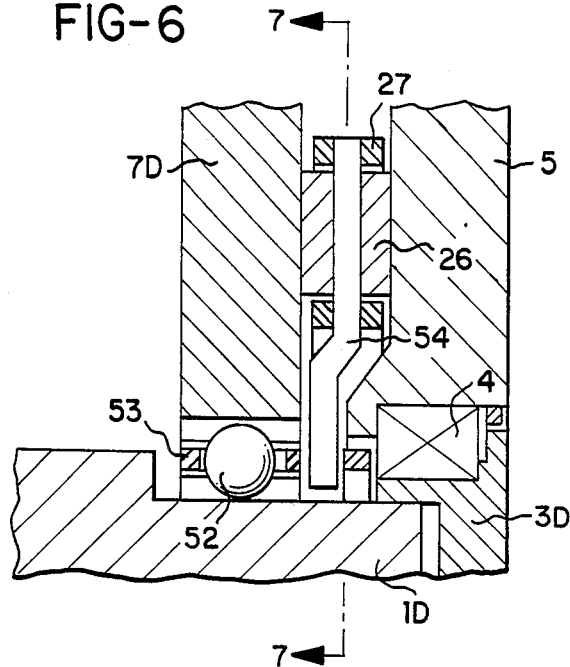
FIG. 6 is an enlarged partial sectional view illustrating a variation in the coupling disk and rollers between the disk and secondary part.
Figure 7:
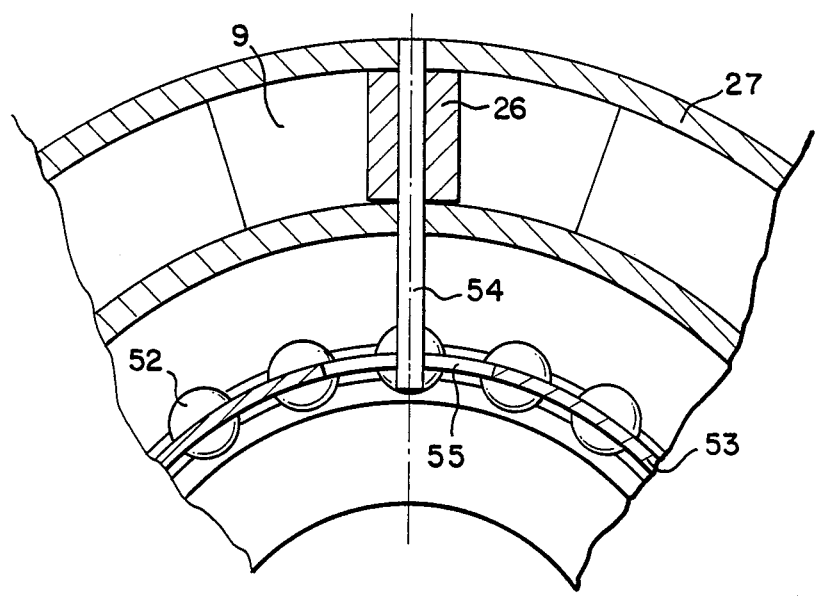
FIG. 7 is a sectional view taken generally along line 7—7 in FIG. 6.

FIGS. 6 and 7 illustrate a further variation in the present invention. Coupling part 7D is connected, unrotatably and axially-displaceably, by means of roller bodies 52, to the primary part 1. On the lateral wall of the secondary part 5 and on the facing surface of the coupling disk 7 are disposed rings of axially-extending recesses 9, between which are roller bodies 26. Roller bodies 26 are guided in the cage 27. The roller bodies 52 are likewise held in a cage 53, which is connected, axially-fixedly, to the outer cage 27 by means of bolts 54. Longitudinal slits in the cage 53 permit relative circumferential movement by bolts 54.

Upon initiation of a moment of rotation in the primary part 1, the coupling disk 7D is carried along and axially displaced by means of the roller bodies 26 which lie in the recesses 9, whereby axial force is exerted on the coupling disk 7D by means of the sets of springs 8.

The coupling disk 7D is displaced axially under the influence of external forces until equilibrium between the latter and the opposing spring forces has been reached. The cages 27 and 53, with the roller bodies 26 and 52, thereby cover half of the distance which the coupling disk covers. The varying tangential path of the two cages is equalized by means of longitudinal slits 55 on the cage 53.

Referring again to FIG. 1, the coupling part is sealed radially by means of a packing 12 against the housing 2. In the chamber 31 at the left of the coupling part are disposed the cup springs 8, which are guided internally by means of bolts 10. In the chamber 32 at the right of the coupling part 7 are disposed the entrainment means in the form of projections and recesses 9, mounted on the coupling part, which engage in corresponding elements on the secondary part 5.

Figure 8:
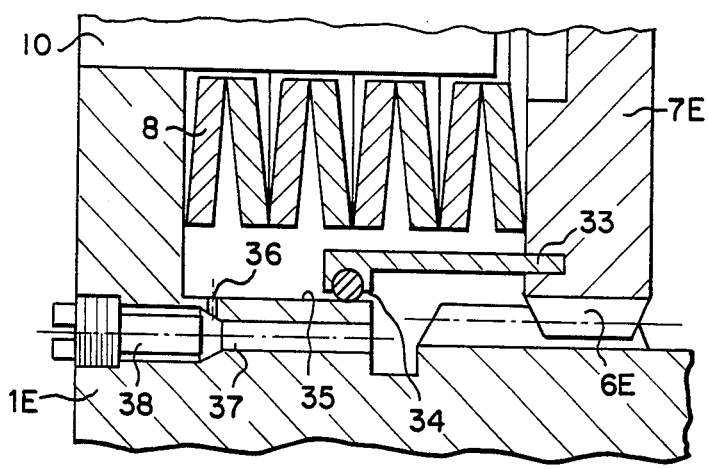
FIGS. 8–11 are enlarged partial sectional views, illustrating arrangements which permit control of oil flow so as to control damping.

During the axial movement of the coupling part 7 to the left, damping fluid is pressed out of the chamber 31 into the chamber 32 by means of the coupling teeth arrangement 6. Upon reduction in the rotational force moment, the damping oil flows back again. According to a further embodiment of the invention shown in FIG. 8, a tube-like control part 33, which carries a radial packing 34 at its outer end, is disposed on the coupling part 7E, on the left side, for regulating the damping.

In the working stroke, this packing 34 glides on the cylindrical hub face 35 of the primary part 1E. At the end of the hub face, on the circumference, in a plane perpendicular to the axis, are disposed a plurality of radial throttle openings 36, which go out from the axially-directed, outwardly-leading channels 37, whereby the throttle openings can be altered from outside the coupling by means of regulating screws 38. This provides the possibility of influencing the flow-through of the damping fluid over the entire course of moment of rotation without disassembling the coupling.

Figure 9:
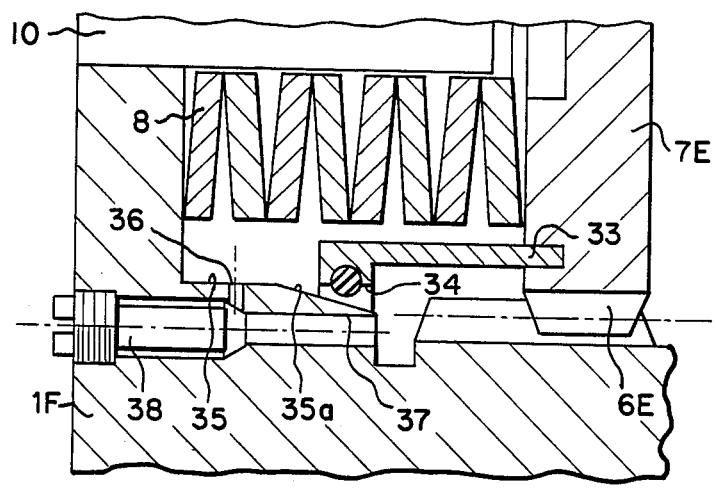

In a somewhat different embodiment shown in FIG. 9 are disposed a conically-ascending surface 35a, and a cylindrical surface 35 on primary part 1F. Surface 35 has throttle openings 36 at its end. As the rotational force moment is increased, a free flow-through takes place initially through the intermediate space between the packing 34 and the conical surface 35a. Later, the flow-through becomes smaller and then is entirely closed off, whereupon the flow takes place through the channels 37 and throttle openings 36. The flow can be influenced by means of regulating screws 38. With this regulation a damping characteristic can be attained which differs depending on the rotational force moment applied to the part 1F.

Figure 10:
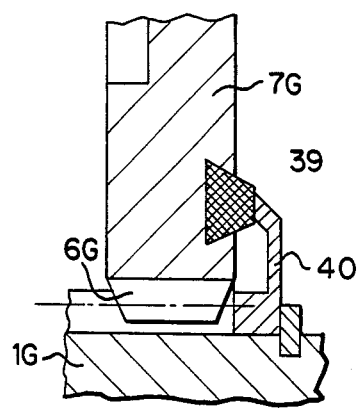

In a further embodiment, shown in FIG. 10, there is provided, at the right of the coupling part, in the end position, a pair of packings 39 and 40, which are closed when the coupling is set to zero. Their purpose is, upon reversal of moment of rotation, passing through zero, briefly to interrupt the flow through the tooth arrangement 6C. This may be advantageous in a specific type of design of the projections and recesses 9.

Figure 11:
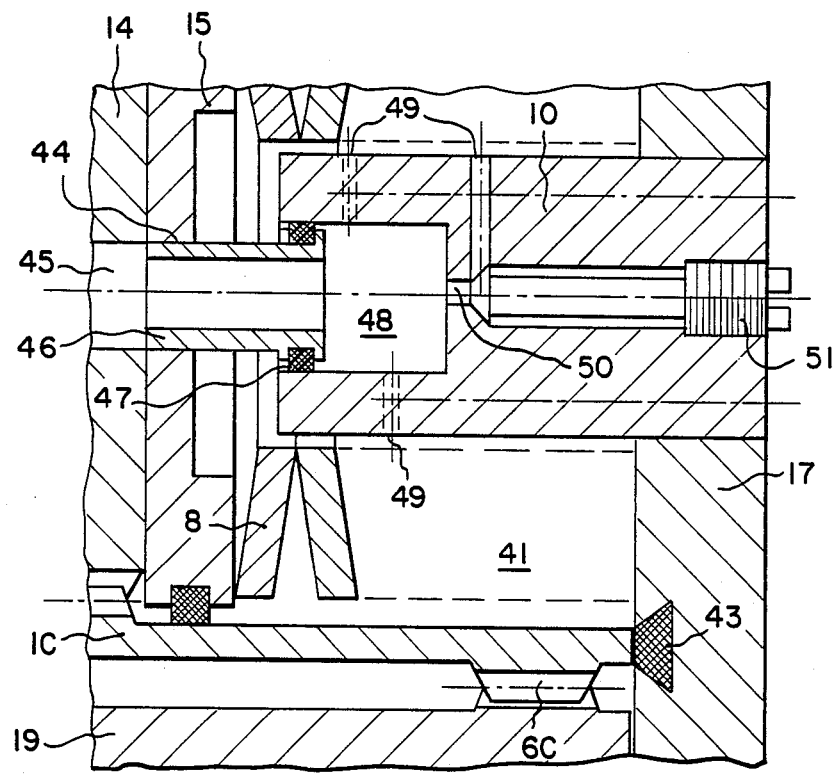

The device shown in FIG. 2 may be further modified as illustrated in FIG. 11. The supporting disk is provided internally and externally with radial packings 12 and 18, by means of which it is calked with relation to the housing 2 or the primary part 1B. It divides the internal space of the coupling into the right-hand chamber 41, which contains the sets of springs 8, and into the left-hand chamber 42, in which the coupling part 14 is disposed. In the embodiment of FIG. 3, the damping fluid flows through the teeth 6C and the teeth on the coupling part 14 from the right-hand chamber into the left-hand chamber, the teeth acting to control this flow.

In the arrangement of FIG. 11, this flow path is interrupted by an axially-acting packing 43. The supporting disk 15 and the coupling part 14 are provided with borings 44 and 45 through which the damping fluid can flow. In the borings 45 of the supporting disk are disposed tube-like control parts 46, which carry a radial packing 47 at their outer end. Packing 47 glides in the cylindrical recesses 48 of the bolts 10. Perpendicular to the axis of the bolt and displaced in the direction of the openings, radial throttle openings 49, which lead into the interior of the chamber 41, are disposed on perpendicular planes. The openings 49 are each connected to channels 50, the flow through which is controlled by regulating screws 51. The damping of the coupling can be regulated therefore by adjusting screws 51. As a result of axial movement of the coupling part or the supporting disk, the throttle openings 49 are closed one after another by the radial packing 47 of the control part 46. Thus the damping is affected by changes in the rotational force moment applied to the coupling.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. An oscillation damping shaft coupling comprising:
a cylindrical primary part having a first plurality of teeth for engaging and being driven by complementary teeth of a shaft hub, and a second plurality of teeth, said primary part being concentric with said hub;
a secondary part forming a housing shaped to receive said primary part and said shaft hub and forming a fluid-tight chamber therewith, said secondary part including a first plurality of axially-extending projections extending into said chamber;
an annular coupling disk having a third plurality of teeth meshing with said second plurality of teeth, a second plurality of axially-extending projections meshing with said first plurality of projections, and a first, radially extending bearing surface, said coupling disk being axially slidable relative to said secondary and primary parts such that said second and third pluralities of teeth slide relative to each other;
an annular supporting disk having a second radially extending bearing surface opposing said first surface and extending between and forming a fluid-tight seal with said primary and secondary parts, thereby dividing said chamber into two parts, said supporting disk being slidable between said primary and secondary parts; and resilient means extending between said secondary part and said supporting disk for urging said supporting disk against said coupling disk such that said first and second set of projections are held in meshing contact with each other, said resilient means including elongate bolt means extending between said secondary part and said supporting disk for preventing relative rotation between said supporting disk and said resilient means, whereby torsional stress at a predetermined level applied to said primary and secondary parts causes slippage between said first and second pluralities of axial projections, thereby urging said coupling disk against and displacing said supporting disk such that fluid is forced thereby to flow between said chamber parts solely through said meshing teeth of said hub, primary part, and coupling disk, said meshing teeth being shaped to provide a throttling action to fluid passing therebetween, thereby damping axial movement of said coupling disk and said support disk.

2. The shaft coupling of claim 1 wherein said axially-extending projections each include inclined lateral surfaces thereon such that said projections of said first and second sets matingly engage each other.

3. The shaft coupling of claim 2 wherein said first and second axially-extending projections include first and second radially-extending surfaces, respectively, supporting said first and second projections.

4. The shaft coupling of claim 2 wherein said lateral surfaces have an inclination of between 20° and 45°.

5. The shaft coupling of claim 2 wherein said lateral surfaces are inclined such that inclination of front ones of said inclined surfaces vary in pitch from an inclination of rear ones thereof.

6. The shaft coupling of claim 1 wherein said supporting disk includes recess means for receiving ends of said bolt means therein, said recess means being sized to act as stop means for limiting travel of said supporting disk and coupling disk.

7. The shaft coupling of claim 1 further comprising screw means for adjustably urging said coupling disk and said secondary parts together, thereby adjustably compressing said resilient means.

8. The shaft coupling of claim 1 wherein said resilient means exerts a force upon said coupling disk such that said projections disengage and allow slipping between said primary and secondary parts upon application of sufficient torque to said primary part.

9. The shaft coupling of claim 1 wherein said supporting disk includes gasket means extending about inner and outer peripheries thereof for forming seals with said primary and secondary parts, respectively.

10. The shaft coupling of claim 1 wherein said secondary part includes a cylindrical housing enclosing said coupling means and said resilient means, and a cover enclosing an end of said housing, said housing and cover including a cooling fin.

11. The coupling of claim 1 wherein said resilient means includes a plurality of means each having a central bore therethrough; said bolt means includes a plurality of bolts attached to said secondary part and extending through said bores; said coupling disk includes recesses sized to receive said bolts, whereby said bolts act as a stop for travel of said supporting disk, and a plurality of pins attached to said support disk and telescoping into said bolts, whereby said bolts may be separated from said support disk but remain in registry therewith.

* * * * *